United States Patent [19]

Fischer et al.

[11] Patent Number: 4,706,524
[45] Date of Patent: Nov. 17, 1987

[54] CIRCULAR KNIFE AND METHOD OF MAKING SAME

[75] Inventors: Robert R. Fischer, Michigan City; W. James Fischer, Valparaiso, both of Ind.

[73] Assignee: Urschel Laboratories, Incorporated, Valparaiso, Ind.

[21] Appl. No.: 921,058

[22] Filed: Oct. 21, 1986

Related U.S. Application Data

[62] Division of Ser. No. 738,429, May 28, 1985, Pat. No. 4,660,453.

[51] Int. Cl.$^4$ ................................................ B21K 5/12
[52] U.S. Cl. ....................................... 76/101 A; 76/112
[58] Field of Search .................. 76/101 A, 101 R, 112

[56] References Cited

U.S. PATENT DOCUMENTS

| 1,345,045 | 6/1920 | Waters | 76/101 A |
| 2,531,841 | 11/1950 | Cashin | 83/676 |
| 4,167,132 | 9/1979 | Zontelli | 83/676 |

*Primary Examiner*—Roscoe V. Parker
*Attorney, Agent, or Firm*—Bacon & Thomas

[57] ABSTRACT

An improvement in the structure of a circular knife including a novel method of making its peripheral cutting edges by reducing the number of operations required to produce the knife. Previously, as presently known, the peripheral cutting edges of circular knives involves the expense of individually cutting material out of a peripheral area as compared to the unique method of the subject disclosure which simultaneously shears and forms offset portions and radial portions, and wherein the outer knife ends of these portions are simultaneously sharpened by a common bevel which causes the edges of the sharpened ends of the offset portions to be inset with reference to the sharpened ends of the radial portions. These two significant factors in the manfacture of circular knives constitute a meritorious advance in the art.

14 Claims, 16 Drawing Figures

CIRCULAR KNIFE AND METHOD OF MAKING SAME

This application is a division of application Ser. No. 738,429, filed May 28, 1985, now U.S. Pat. No. 4,660,453.

BACKGROUND OF THE INVENTION

In order to promote a better understanding of the subject invention, as alluded to in the Abstract, it is deemed beneficial to present a background of information in order that the attributes or advantages of the improved knife can be compared with a prior knife that has been and is still being used in the food processing industry.

Prior knives 121 are shown for cutting a product in a Joe R. Urschel and Gerald W. Urschel U.S. Pat. No. 3,053,296 which issued on Sept. 11, 1962. This Patent is owned by Urschel Laboratories, Inc. of Valparaiso, Ind. Knives like 121, and other prior knives, hereinafter described, have been utilized extensively in equipment manufactured by Urschel Laboratories, Inc. for slicing string beans lengthwise for many years in the United States and an appreciable number of years in foreign countries, and is still being used with success by food processors.

It may be stated that past method of making a knife requires a machine to cut away pieces of metal for each serration. This is time consuming and therefore expensive. There is a practical limit to how much metal can be removed by this method and therefore a limit as to how deep and how wide the serrations can be made. When food processors use these knives, the knives are resharpened when they become dull. This sharpening is done by making a new narrow bevel on the side of the knife opposite the serrations so that the serrations are not removed. There is a limit to how many times the knives may be resharpened before the serrations are removed and the knife becomes useless. It is sometimes desirable to have the serrations extend inward toward the center of the knife a good distance. The reason for this is that when the circular knives are spaced close together for cutting certain products into thin strips, the wedging of a food product between adjacent knives helps to pull the product through them. The fact that it is not practical to make serrations deep into the knife by past methods of making serrations caused limited use of knives made by this method.

OBJECTS OF THE INVENTION

The attributes or advantages of the subject invention are very important and one of the most significant objectives is the reduction in the operations of the manufacture of the knife including its maintenance.

More specifically, an objective of the invention is to provide a circular knife in which all of the peripheral serrations are made substantially simultaneously, as distinguished from the detailed and expensive method of individually cutting out grooves or serrations of the material as described subsequently.

An important objective of the invention is to provide a knife in which circumferentially spaced radial portions and offset portions in the peripheral area have outer ends which are simultaneously sharpened with a common bevel and whereby the tips of the sharpened edges of the offsets are inset a predetermined distance with respect to the outer sharpened ends of the radial portions.

Further, an object is to provide an improved method whereby the knives can be made with much deeper serrations, also with greater width, which when dull will cut beans that serrated knives made in accordance with FIGS. 1-5 will not be cut. These deeper serrations also offer advantages with respect to sharpening.

A significant objective of the invention is to provide a knife having a notched center opening, an inner circumferential area surrounding said inner area, and a peripheral area which is designed and constructed to provide circumferentially spaced radial portions and circumferentially spaced offset portions respectively arranged between adjacent radial portions.

Also, an object is to provide a knife whereby there is practically no limit as to how wide or narrow the serrations can be made or how far they can extend toward the center of the knife.

Additional objects and advantages of the invention will become apparent after the description hereinafter presented is considered in conjunction with the drawings annexed hereto:

FIG. 1 of the drawings shows a prior art knife 1 prior to being serrated;

Figure 1:
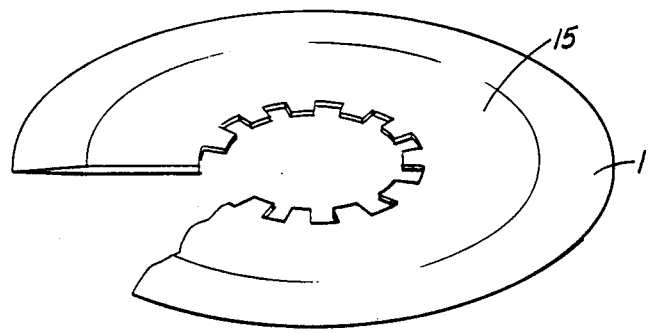
Figure 2:
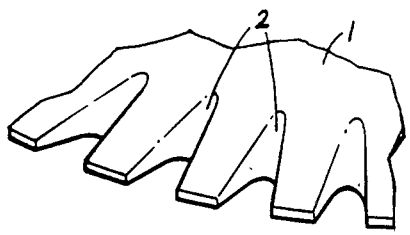
FIG. 2 is a partial pictorial view of the top side of a prior art knife showing circumferentially spaced radial grooves 2 which have been individually cut in the peripheral area of the knife.
Figure 3:
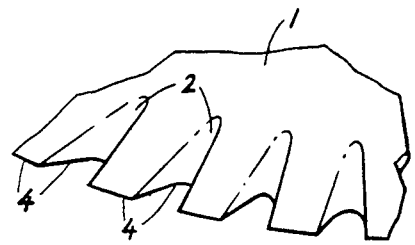
FIG. 3 is the top view of the prior art knife of FIG. 2 that has been sharpened.
Figure 4:
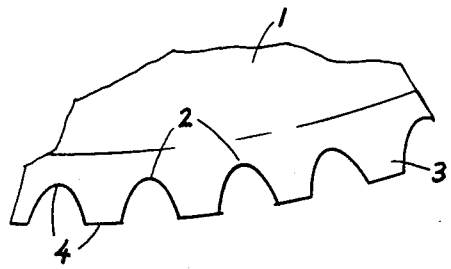
FIG. 4 shows the bottom side of the prior art knife of FIG. 3 and a narrow bevel caused by sharpening the bottom side of the knife.

In furtherance of the description of FIG. 3 it should be stated that the knife is sharpened by grinding a narrow bevel 3 on the bottom side of the knife. This bevel is much steeper than a prior bevel and produce a sharp edge 4 at both the periphery of the knife and in the bottom of the grooves or serrations.

Figure 5:
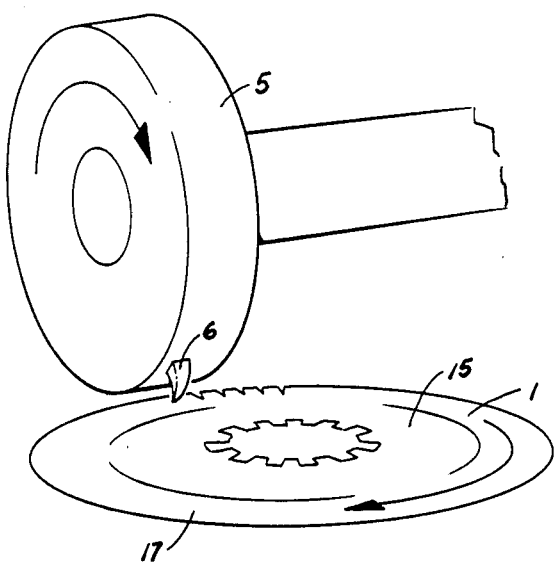
FIG. 5 illustrates how the grooves are made according to prior art practice.

In furtherance of the description of FIG. 5 it should be stated that a tool holder 5 supporting a cutting tool 6 is rotated at 200 R.P.M. during one revolution of the knife 1 to construct each groove of the appreciable number in periphery. This is an expensive and time consuming operation and also has the disadvantages above alluded to.

The structure and method in making the knife of the subject invention is illustrated in FIGS. 6–16 and initially involves running a strip of steel through a punch press. With each stroke of the press, a blank is made which is circular and has an opening 13 in the center. This opening or hole is not round but is notched at 14 so that a splined shaped device can drive the knife in a lathe so as to put bevels on the knife. After the punch press operation utilizing a die 10 and punch 11 the knives are run through a series of rolls (not shown) which bend the knife back and forth which results in making crooked knives flat. The next operation or step is to make a bevel 16 on both sides of the knife at one time in a lathe. The peripheral edge if left a few thousands of an inch thick. The knives are again straightened or flattened through the same set of straightening rolls used the first time the knives are straightened.

Figure 7:
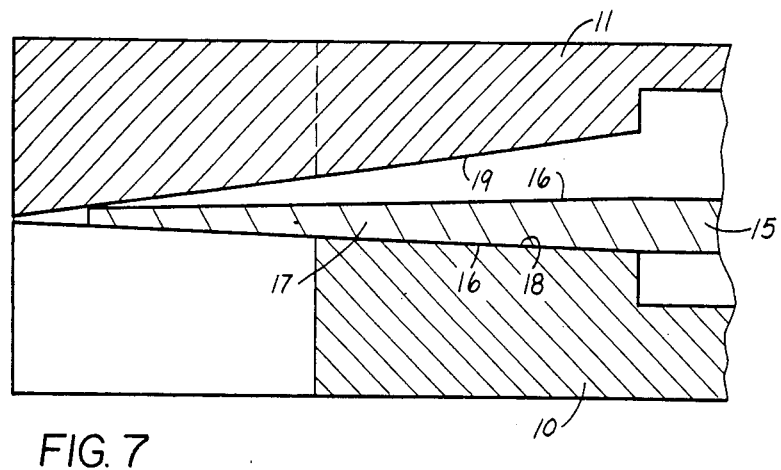
FIG. 7 is a partial sectional view of the die and punch with the knife therebetween just prior to the shearing action by downward pressure of the punch.

The knife 12 has a circumferential area 15 of uniform thickness surrounding the opening 13 and the bevel 16 on each side of the knife as best shown in FIG. 7, and defines a circumferential tapered area 17 which does not form a sharp outer peripheral edge, but there remains an edge a few thousands of an inch in thickness.

Figure 8:
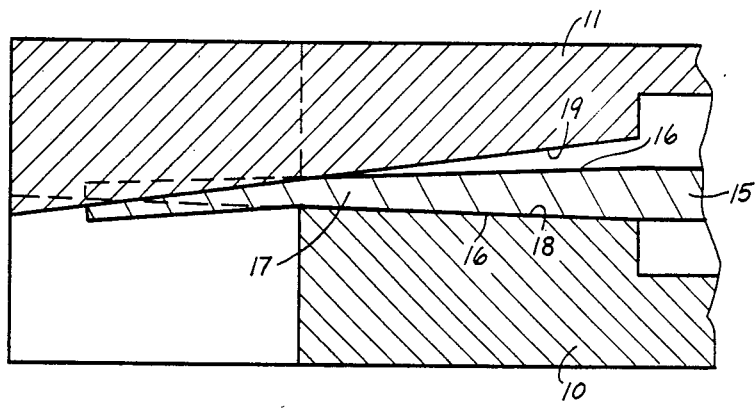
FIG. 8 shows the result of the action of the full downward pressure of the punch.

The top surface of the die 10 is made with a bevel 18 to fit the bottom bevelled surface of the knife. The punch 11 has a bevel 19 on its lower surface which has a greater angle than the angle of the bevel on top the surface of the knife as illustrated in FIGS. 7 and 8.

Figure 6:
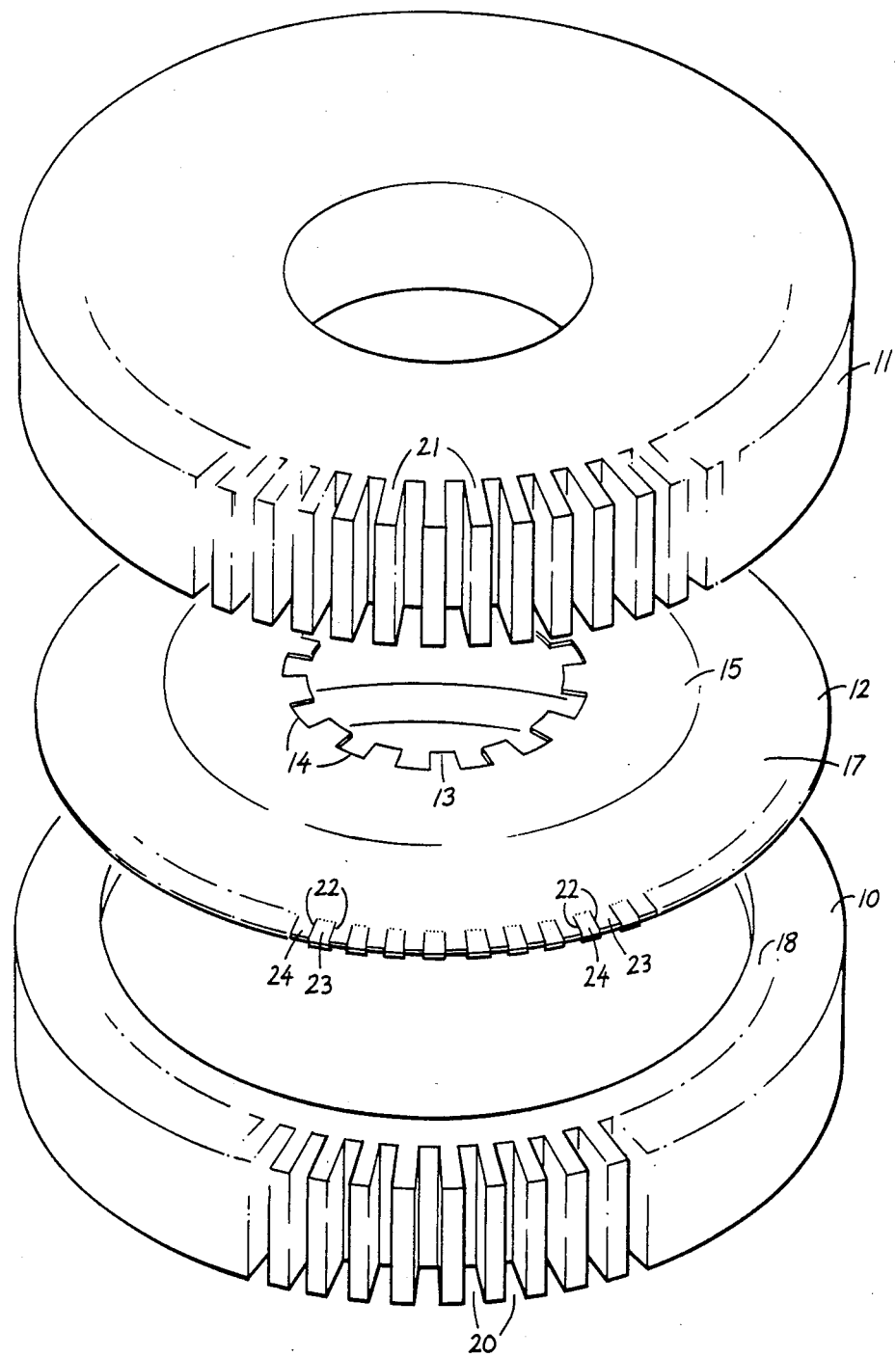
FIG. 6 is a view of a die and punch which serves to shear and form in the peripheral area of the knife the serrations by the improved methods.
Figure 9:
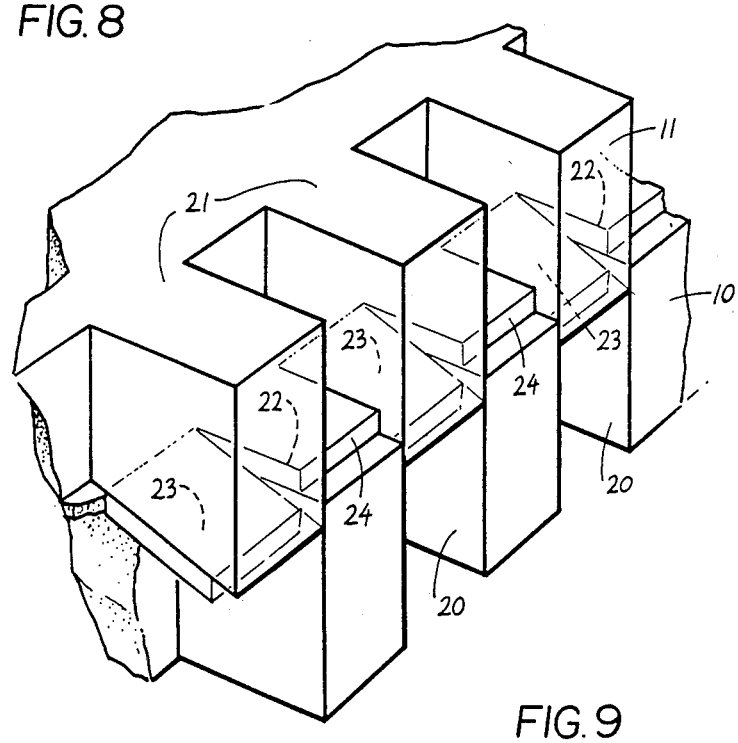
FIG. 9 depicts more in detail how the metal of the knife is serrated by the die and punch.

As depicted in FIGS. 6 and 9, the die 10 is provided with a periphery which is interrupted by circumferentially equally spaced apart radial openings or notches 20 and the punch 11 has circumferentially equally spaced radial projections 21. The relationship of the notches and projections is precise so that when the punch is driven downwardly the projections 21 will cause shearing of the knife at 22 and provide corresponding offset serrations or portions 23 to move into the openings 20. The method of making the serrations in a one-step operation by simultaneously shearing and forming the offsets is considered to be a meritorious advance in this field of endeavor. The method also offers the advantage of providing circumferentially spaced tapered radial projections 24 of the knife substantially between adjacent offset serrations or teeth 23.

Figure 10:
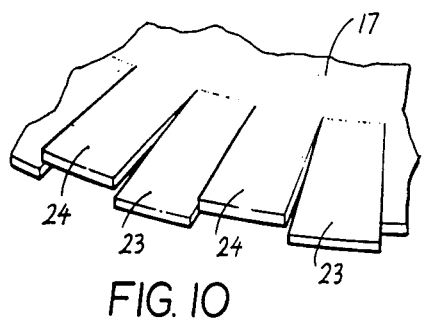
FIG. 10 is a partial pictorial view of the knife showing the result of the die and punch operation.
Figure 11:
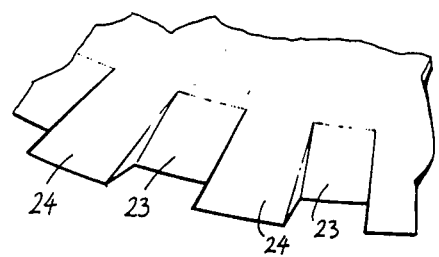
FIG. 11 is a partial pictorial top view of the knife showing the appearance of the serrations after sharpening.
Figure 12:
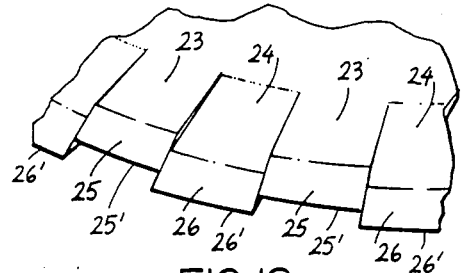
FIG. 12 is a partial bottom view of the bottom side of the knife showing the serrations.
Figure 13:
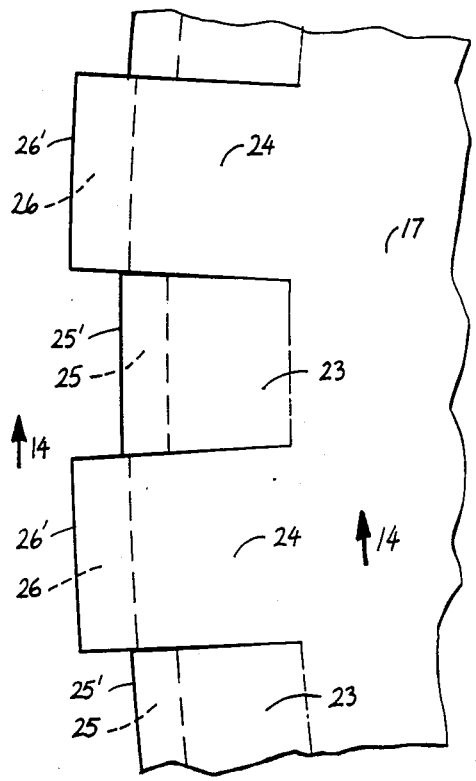
FIG. 13 is a partial enlarged top view of the knife after sharpening.
Figure 14:
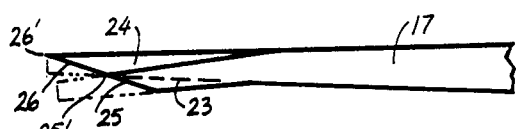
FIG. 14 is a section taken on base 14—14 of FIG. 13.

After the operation to form the offset portions 23 and radial portions 24 as depicted in FIG. 10, the outer ends of these portions are simultaneously sharpened with bevels 25 and 26 to provide an edge 25' on each offset and an edge 26' on each of the radial portions 24. These bevels lie in a common or single plane as shown in FIG. 14.

When this sharpening is completed, as shown, a portion of each offset is removed so the tip of the sharpened edges 25' of the offsets are inset corresponding distances with reference to the sharp edges 26' of the radial peripheral portions of the knife.

Figure 15:
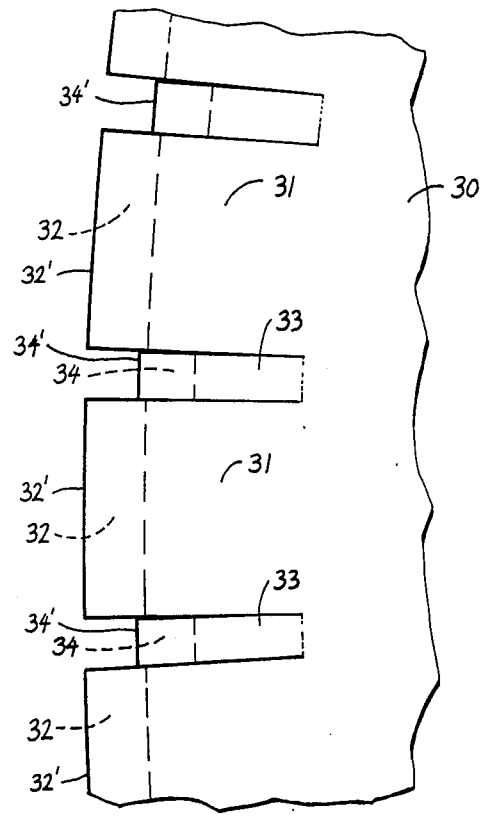
FIG. 15 is a partial enlarged view of a top side of a knive whereby peripheral radial portions may be made in various circumferential dimensions.

FIG. 15 illustrates a modified knife 30 which illustrates radial portions 31 which are sharpened to provide bevels 32 and edges 32' and offset portions 33 having bevels 34 and sharpened edges 34' which are made respectively wider and narrower than the radial portions 24 and offsets 23. Also, if so desired these portions may be made somewhat longer. The sharpened edges 31' and 34' are made simultaneously like the edges 25' and 26' described above.

Figure 16:
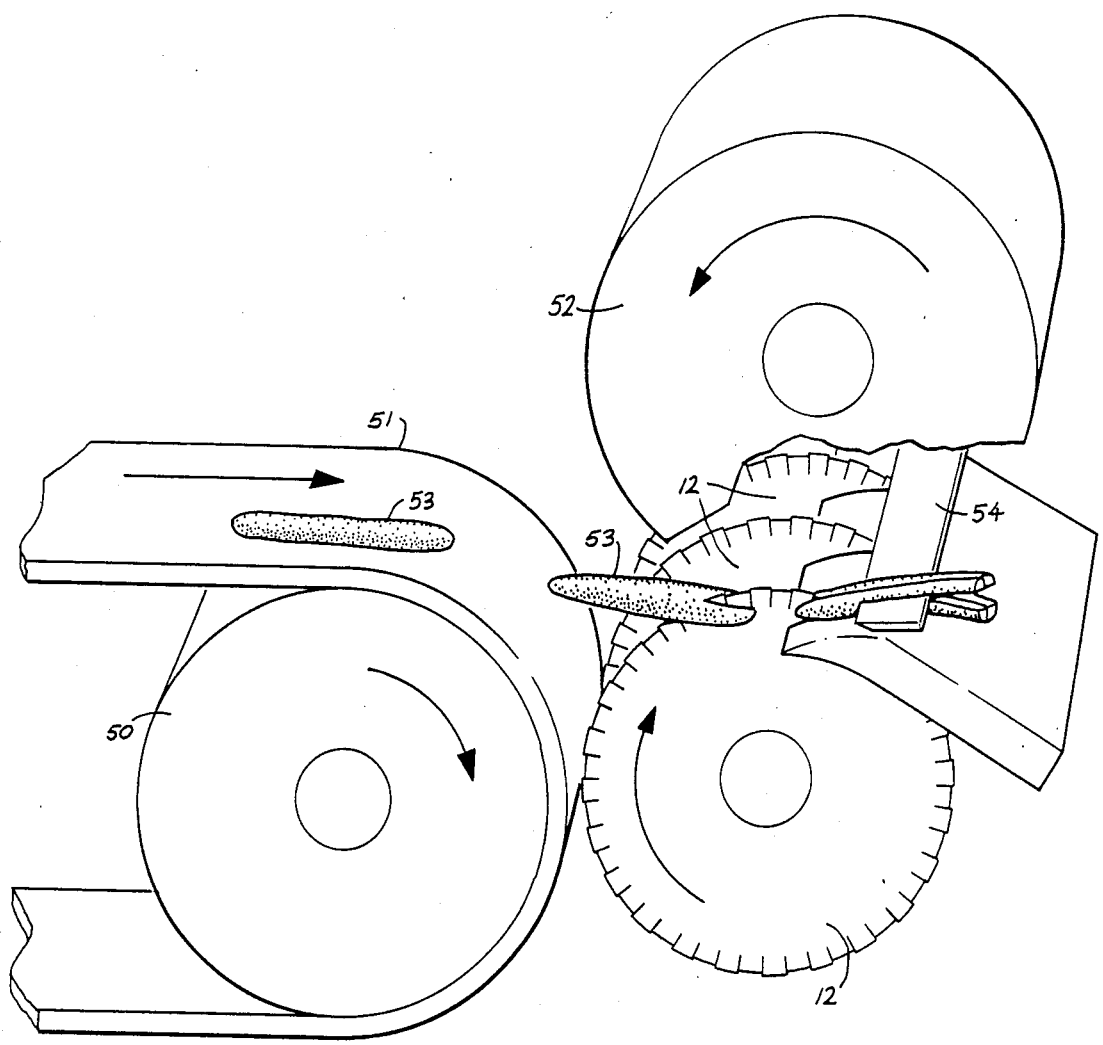
FIG. 16 illustrates a machine for utilizing knives embodying the subject invention.

In FIG. 16 there is illustrated components of a machine substantially disclosed in the above Patent. Briefly the components shown are a feed roller 50 carrying a conveyor belt 51 which in cooperation with the feed roller 52 serves to feed or deliver string-beans 53 to the serrated circular knives for slitting the beans endwise. A stationary knife 54 serves to slice the beans in a plane transverse to those cut by the knives. Reference to the Patent will offer additional operational details of the machine although reference is not deemed necessary to understand the principles of design, structure, method, and the advantages involved in the knive of the subject invention.

In view of the foregoing the method of simultaneously shearing and forming offsets and radial portions in the peripheral area of the knife and the simultaneous sharpening of the outer ends of these portions constitute real improvements which are superior to the prior method. Furthermore, the versatile mode whereby the portions may be made in different widths and radial lengths adds to the durability of the knife as it can be sharped many times.

Having thus described our invention or inventions, it is obvious that various modifications or additions to those described may be made in the same without departing from the spirit of the invention and, therefore, we do not wish to be understood as limiting ourselves to the exact forms, constructions, arrangements, and combinations of the components herein shown and described.

We claim:

1. A method of making a circular knife comprising the steps of:
   (a) providing a circular-shaped metal blank;
   (b) simultaneously forming a plurality of alternating and circumferentially spaced radial projections and offset serrations around the periphery of the blank; and
   (c) sharpening the projections and serrations by beveling the outer edges thereof, wherein the bevels of the projections and serrations are disposed in a common plane.

2. The method of claim 1 further including the step of removing a portion of each offset serration to inset the sharpened edges of the serrations with respect to the sharpened edges of the radial projections.

3. The method of claim 1 wherein the radial projections are wider than the offset serrations.

4. The method of claim 1 further including the step of tapering the periphery of the metal blank prior to forming the radial projections and offset serrations.

5. The method of claim 1 wherein the radial projections and offset serrations are simultaneously formed between a cooperating die and punch assembly.

6. A method for making a circular knife comprising the steps of:
   (a) punching a strip of metal to form a circular-shaped metal blank having a notched central opening;
   (b) straightening the metal blank by directing the blank through a series of rolls;
   (c) tapering the periphery of the blank;
   (d) straightening the tapered blank by directing the blank through a series of rolls;

(e) simultaneously forming a plurality of alternating and circumferentially spaced radial projections and offset serrations around the periphery of the blank;

(f) sharpening the projections and serrations by beveling the outer edges thereof, wherein the bevels of the projections and serrations are disposed in a common plane; and (g) removing a portion of each serration to inset the sharpened edges of the serrations with respect to the sharpened edges of the radial projections.

7. The method of claim 6 wherein the radial projections and offset serrations are simultaneously formed between a cooperating die and punch assembly.

8. The method of claim 6 wherein the radial projections are wider than the offset serrations.

9. The method of claim 1 wherein the radial projections and offset serrations are simultaneously formed by shearing the periphery of the blank.

10. The method of claim 1 wherein the radial projections are narrower than the offset serrations.

11. The method of claim 1 wherein the radial projections and the offset serrations are of the same width.

12. The method of claim 6 wherein the radial projections and offset serrations are simultaneously formed by shearing the periphery of the blank.

13. The method of claim 6 wherein the radial projections are narrower than the offset serrations.

14. The method of claim 6 wherein the radial projections and the offset serrations are of the same width.

* * * * *